No. 742,361. PATENTED OCT. 27, 1903.
E. R. SEWARD.
VARIABLE SPEED MECHANISM.
APPLICATION FILED MAY 17, 1902.
NO MODEL. 3 SHEETS—SHEET 1.

Witnesses:
Emma P. Coffin
Harris B. Freeman

Inventor:
Ernest R. Seward
By Jenkins & Barker,
Attorneys

No. 742,361. PATENTED OCT. 27, 1903.
E. R. SEWARD.
VARIABLE SPEED MECHANISM.
APPLICATION FILED MAY 17, 1902.
NO MODEL. 3 SHEETS—SHEET 2.
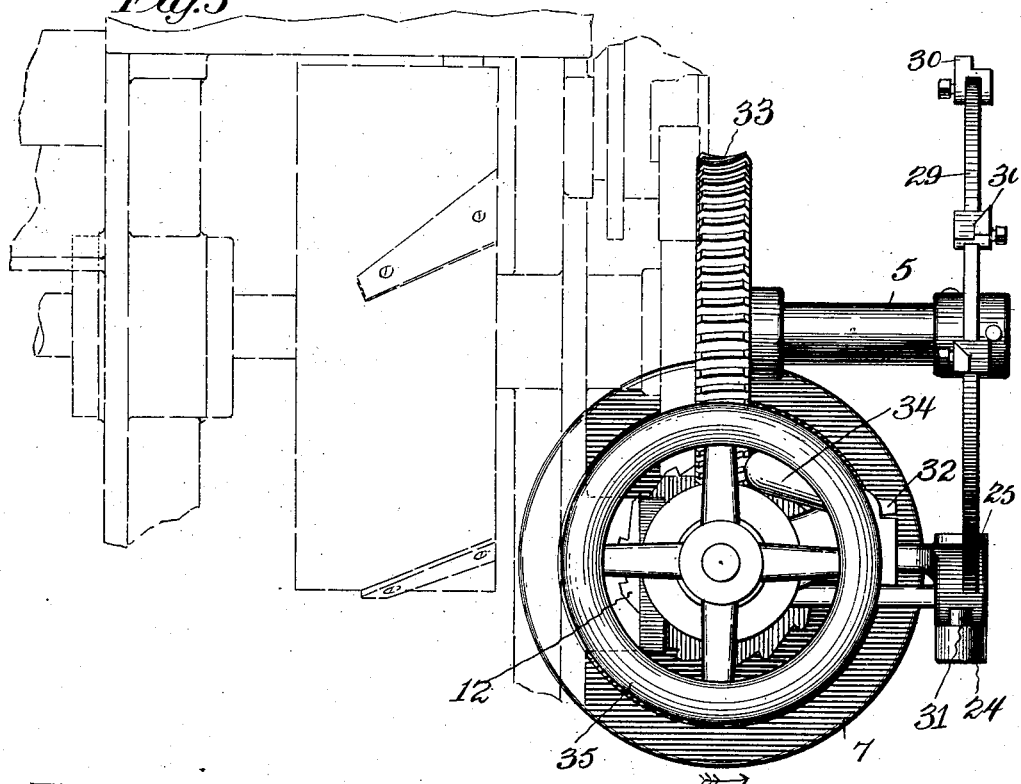
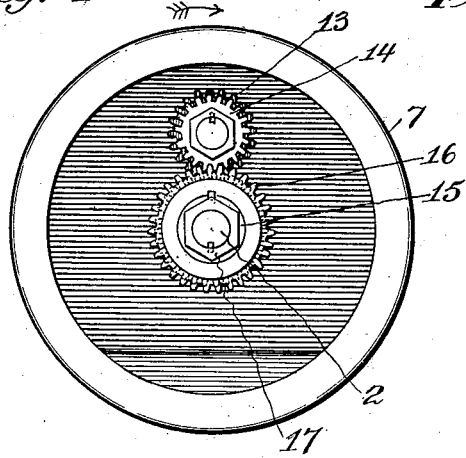
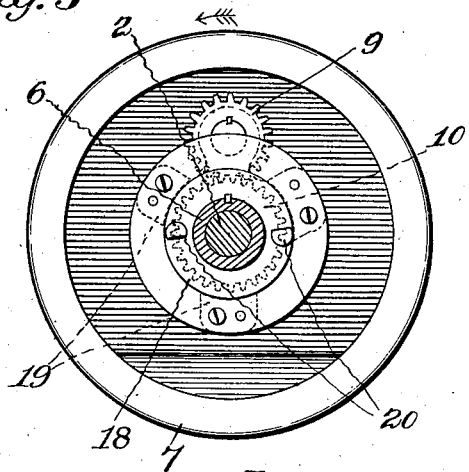
Witnesses:
Inventor,
Ernest R. Seward
By Jenkins & Barker
attorneys No. 742,361. PATENTED OCT. 27, 1903.
E. R. SEWARD.
VARIABLE SPEED MECHANISM.
APPLICATION FILED MAY 17, 1902.
NO MODEL. 3 SHEETS—SHEET 3.
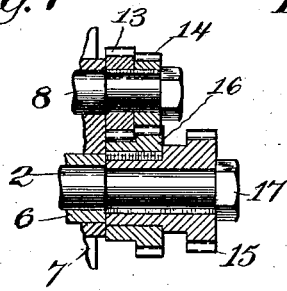
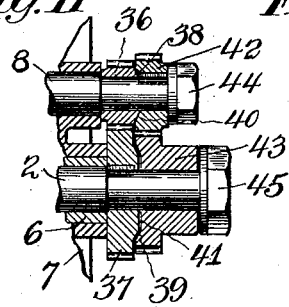
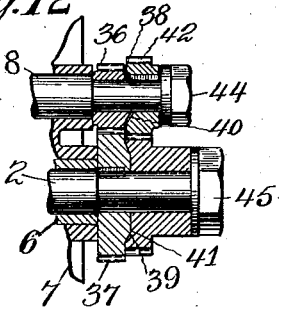
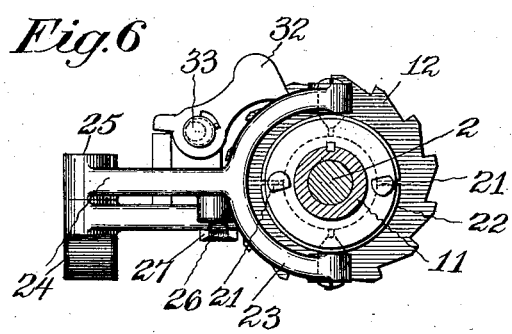
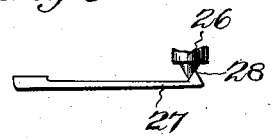
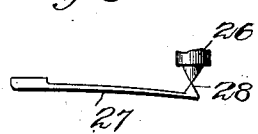
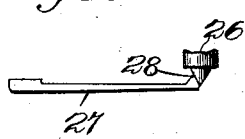
Witnesses:
Emma P. Coffrin
Harmon B. Freeman
Inventor,
Ernest R. Seward.
By Jenkins & Barker
Attorneys No. 742,361. Patented October 27, 1903.

UNITED STATES PATENT OFFICE.

ERNEST R. SEWARD, OF HARTFORD, CONNECTICUT, ASSIGNOR TO THE HARTFORD MACHINE SCREW COMPANY, OF HARTFORD, CONNECTICUT, A CORPORATION OF CONNECTICUT.

VARIABLE-SPEED MECHANISM.

SPECIFICATION forming part of Letters Patent No. 742,361, dated October 27, 1903.

Application filed May 17, 1902. Serial No. 107,728. (No model.)

*To all whom it may concern:*

Be it known that I, ERNEST R. SEWARD, a citizen of the United States, and a resident of Hartford, in the county of Hartford and State of Connecticut, have invented certain new and useful Improvements in Variable-Speed Mechanism, of which the following is a specification.

The invention relates to mechanisms for varying speeds, and is particularly designed, as shown in the accompanying drawings, to be used for varying the speed upon the main cam-shaft of a metal-working machine.

The object of the invention is to produce a very simple and effective speed-changing mechanism which will be absolutely positive in its action and may be changed almost instantaneously from one speed to another, and this without the liability of fracturing any of the several parts of the clutch mechanism.

A further object is to provide a means for varying the changes of speed; and a still further object is to provide positive clutch mechanism which will obviate all tendency of slip between the driving and driven members and to provide operating means for said clutch which will insure its perfect and proper action at all times without danger of undue strains being thrown upon the several parts of the mechanism.

Another object is to provide an actuating mechanism for the clutch composed of two separate actuating means, one of which gives an initial movement to the parts, while the other completes the movement and locks the clutch in one of its several positions.

Figure 2:
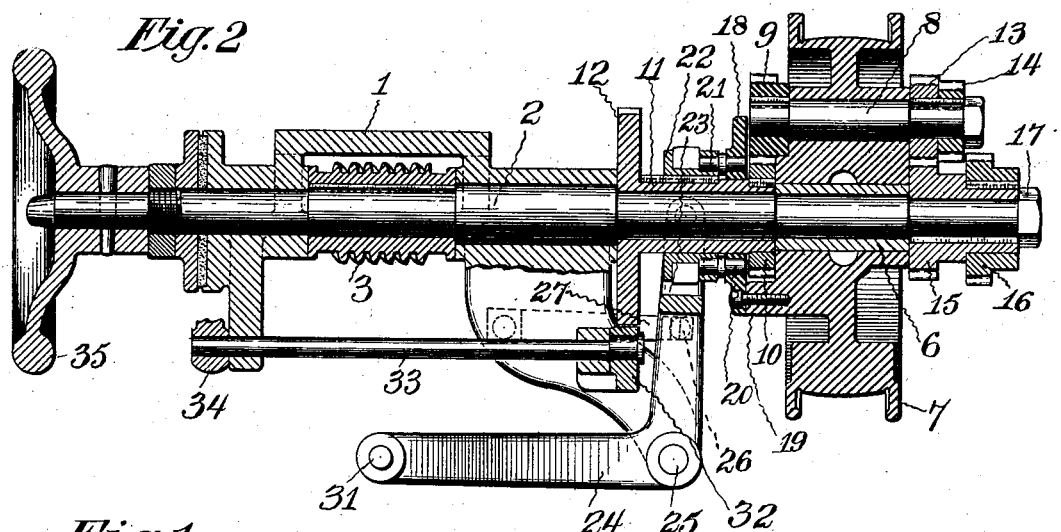
Figure 1:
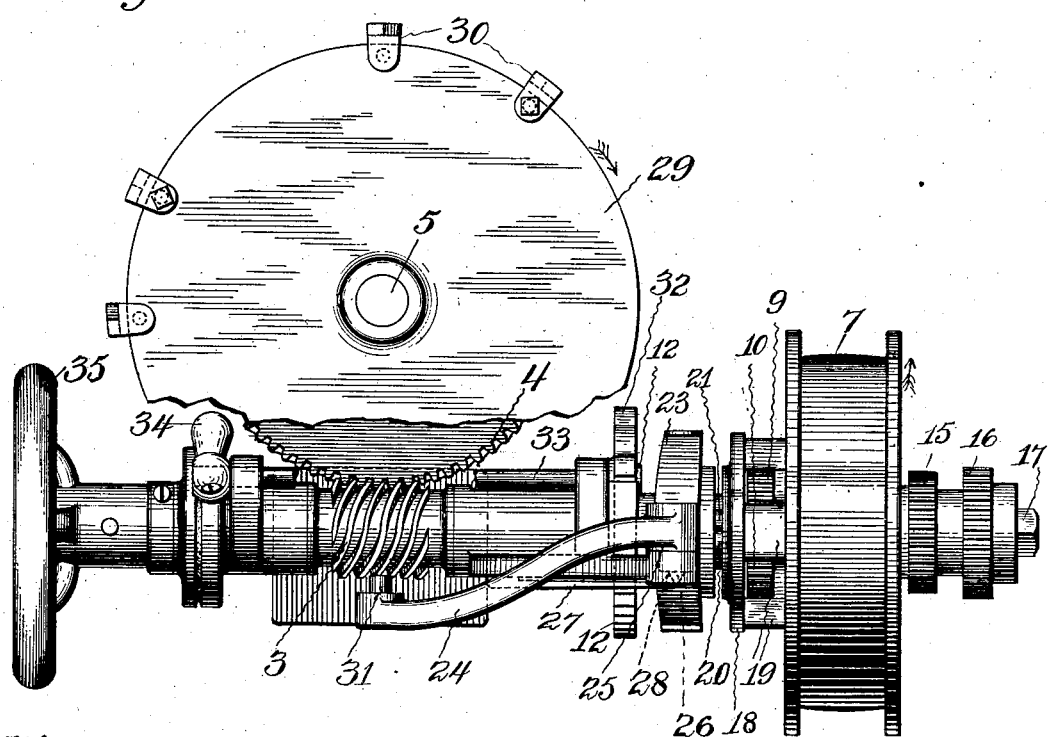

Referring to the drawings, Figure 1 is a view in elevation of the speed-changing mechanism, showing its relative position to the worm-wheel of the cam-shaft. Fig. 2 is a longitudinal sectional view of the parts shown in Fig. 1. Fig. 3 is a detail end view looking from the left of Figs. 1 and 2 and showing in diagram the position of the speed-changing mechanism relative to a metal-working machine. Fig. 4 is a detail view of the right-hand side of the driving-pulley and appurtenant parts shown in Figs. 1 and 2. Fig. 5 is a detail view of the same pulley looking from the left-hand side. Fig. 6 is a detail view of the clutch mechanism and ratchet. Fig. 7 is a sectional view through the speed-changing gears borne upon the side of the driving pulley and shaft, showing the method of varying the gear ratios. Fig. 8 is a detail view of the spring-stop for controlling the position of the clutch. Fig. 9 is a view of the same parts in position to throw the clutch. Fig. 10 shows the parts in position when the clutch has been thrown to the opposite limit of its play from that shown in Fig. 8. Fig. 11 is a detail view of a modified form of change-speed mechanism similar to that shown in Fig. 7. Fig. 12 illustrates the parts shown in Fig. 11 in position to effect a different gear ratio.

In the accompanying drawings the numeral 1 denotes the supporting-frame for the several parts of the change-speed mechanism, which frame is adapted to be secured to any machine in which it is desired to vary the speed of the operating parts. This frame is bored and forms a bearing for the change-speed shaft 2, which has keyed to it a worm 3, coöperating with a worm-wheel 4, secured to the main cam-shaft 5 of the machine, which, as shown in Fig. 3 of the drawings, is an ordinary metal-working machine, known in the art as a "screw-machine." At one end of the shaft 2, mounted upon a suitable bushing 6, is a main driving-pulley 7, and passing through this pulley 7 is a short shaft 8, bearing at one end a spur-gear 9, which meshes with a spur-gear 10, fast upon the sleeve 11, which bears at its opposite end a ratchet-wheel 12. To the other end of the shaft 8 are secured a pair of gears 13 14 of different sizes, one of which, 13, as shown in Fig. 2, meshes with a gear 15, keyed to the shaft 2. This gear 15 also has keyed to it a spur-gear 16, and it will be observed that both the gears 15 and 16 may be slid from the end of the shaft 2 by loosening the lock-nut 17 and may be replaced upon said shaft with the gear 16 in proper position to mesh with the gear 14, thus giving a different gear ratio between the short shaft 8 and the main shaft 2. By this arrangement it is possible to secure several variations of speed requisite for various sorts of work, and obviously the gears 13 14 may also be changed at will, and any number of sets of gears giving various speed ratios may be used upon the short shaft 8 and main shaft 2. These being removably attached to said shaft provide a very ready means for securing numerous adjustments.

Overlying the gears 9 and 10 there is a clutch-plate 18, which through suitable projecting hubs or flanges 19 is secured to and revolves with the driving-pulley 7. This clutch-plate is provided with clutch-pins 20, which may be disposed in any desired number about the plate and coöperate with the clutch-pins 21, which are carried in the clutch member 22. This clutch member 22 is splined to the sleeve of the ratchet 12 and rotates therewith, while a yoke 23 permits rotation of the parts and through its lever 24 determines the position of the clutch member 22 axially of the sleeve of the ratchet 12.

On the under side of the clutch-lever 24 and in front of its pivot 25 is a wedge-shaped stop 26, the sides of which slope to a sufficient degree to give the full throw to the clutch-lever. Coöperating with this stop 26 is a spring-latch 27, and obviously as the clutch-lever 24 is swung far enough to bring the edge of the wedge-shaped stop 26 and the edge 28 of the spring-latch 27 into coincident position a very slight movement of the lever 24 will cause the clutch to be snapped over into either one direction or the other and there held by the spring-latch 27. The adjustment between the main actuating mechanism for the clutch-lever 24 and the spring-latch 27 and its coöperating stop 26 is such that the upper edge 28 of the spring-latch assumes a position just beyond the edge of the wedge-shaped stop 26 before the pins upon the two clutch members are brought into engagement. With this arrangement it is not necessary to give a delicate adjustment to the main clutch-actuating mechanism, and it is only necessary that such mechanism give a partial movement to the clutch-lever, whereupon it becomes inoperative as regards said lever, and thus there is no liability of the main actuating mechanism cramping the clutch-lever and appurtenant parts, as would be the case, for instance, when the two pins on the oppositely-disposed clutch members happen to be in coincident positions. Great trouble has been experienced in mechanisms of this sort heretofore by the breaking of the clutch-levers, due to the forced action of the clutch-actuating cams hereinafter described. The advantages of this mechanism are apparent, for by its use it is not necessary, as has heretofore been required, to have such an accurate adjustment upon the cams which operate the clutch to give the proper throw, and the clutch is always positively held in one of its two positions.

A cam-plate 29, mounted upon the shaft 5 and provided with cams 30, comprises the main actuator for the clutch, and whenever the cams 30 are brought into engagement with the cam-pin 31 upon the end of the lever 24 the latter is swung in one direction or the other to give the initial movement to the clutch-lever and clutch.

A pawl 32, carried upon the end of the shaft 33, normally engages the ratchet 12 and prevents movement of the ratchet and appurtenant parts in one direction. The shaft 33, which controls this pawl, is provided with an operating-handle 34, and the pawl 32 is eccentrically mounted upon it, so that even though there is a heavy load upon the ratchet 12 forcing against the pawl 32 a movement of the handle 34 will readily disengage the pawl and ratchet.

A hand-wheel 35 is also provided upon the main shaft 2, and this of course may be used for setting the several parts in any desired position or may be used for turning backward or forward the several parts of the mechanism to secure any desired adjustment.

The operation of the parts of the mechanism thus far described is as follows: The main pulley 7 when rotated carries with it the shaft 8 and gears keyed thereto, the gears 9 13 14 revolving about the gears 10 15 16. The gears 9 and 13 are provided with the same number of teeth, while the gear 10 has a less number of teeth than the gear 15. Now if the clutch is thrown out of engagement and the pulley rotated the gear 9 will force the gear 10 backward, and with it the ratchet 12. The movement of this ratchet is prevented by the pawl 32, and thus it will be seen that the gear 15 and main shaft 2 will be rotated at a very low speed, dependent, of course, upon the difference in number of teeth between the gear 10 and gear 15. This gives the low speed to the main cam-shaft, which continues until the cam-plate 29 through its cams 30 has actuated the clutch-lever 24 and thrown in the clutch, whereupon all of the parts are positively clutched together and rotated at the same speed as the pulley 7. This gives the high speed.

As above stated, when it is desired to vary the gear ratio between the shaft 8 and shaft 2 the gears 15 16 are reversed as to their position, as shown in Fig. 7 of the drawings, and numerous changes may be made by providing various sets of gears.

In Figs. 11 and 12 of the drawings there is shown a modified form of mechanism for securing a difference of gear ratios between the driving-pulley and main driving-shaft. In these figures the gears 36 and 37 are provided with clutch-surfaces 38 39, which coöperate with clutch-surfaces 40 41 upon the faces of the gears 42 43. The gears 37 and 42 are keyed to their respective shafts, and thus it will be seen that by tightening one or the other of the nuts 44 45 either one or the other of the sets of gears may be made the driving-gears. Fig. 12 illustrates the gear-clutch applied to the opposite pair of gears from that shown in Fig. 11.

While the mechanism herein described is shown in connection with a metal-working machine, it may obviously be embodied in any other class of devices in which a variable-speed mechanism is described, and, in fact, the details of the mechanism herein shown and described might be varied to a great extent without departing at all from the spirit of the invention, which contemplates a change-speed gear which may be readily adjusted for various speeds and in which a positive clutch is used for engaging and disengaging the several parts of the driving mechanism and in connection with said positive clutch and actuating mechanism which will insure perfect and proper operation of the clutch without danger of fracturing the parts.

What I claim as my invention, and desire to secure by Letters Patent, is—

1. In combination in a change-speed device, a support, a shaft borne in said support, a driving-pulley mounted upon the shaft, intermeshing gears mounted upon the shaft and driving-pulley, means for opposing rotation of a gear on the shaft and a positive clutch for controlling the relative speeds of the driving pulley and shaft.

2. In combination in a change-speed gear, a driving-shaft and its support, a driving-pulley loosely mounted upon said shaft, intermeshing gears borne upon the driving-shaft and carried by the driving-pulley, means for opposing the rotation of the gear carried upon the pulley whereby a slow motion is transmitted to the gear of the shaft, and a positive clutch adapted for clutching and releasing actions with respect to the opposing means and driving-pulley.

3. In combination in a change-speed mechanism, a driving-shaft and its support, a driving-pulley loosely mounted upon said shaft, a ratchet provided with a sleeve loosely mounted upon the shaft, means adapted to connect and disconnect said ratchet-sleeve and pulley, and sun-and-planet gears intermediate the ratchet-sleeve, pulley and driving-shaft.

4. In combination in a change-speed gear, a driving-shaft and its support, a driving-pulley loosely mounted on the shaft and provided with a clutch-plate and engaging clutch members, a ratchet sleeved upon the shaft and operatively connected with a clutch member, sun-and-planet gears intermediate the ratchet-sleeve, pulley and driving-shaft, means for imparting an initial movement to the clutch, and means for causing positive engagement or disengagement of the clutch.

5. In combination in a change-speed gear, a main shaft and a support therefor, a driving-pulley operatively mounted upon said shaft, a ratchet mounted upon the shaft and a pawl for preventing movement of the ratchet in one direction, sun-and-planet gears operatively mounted with relation to the ratchet, driving-pulley and driving-shaft, a clutch-plate secured to the pulley, a coöperating clutch arranged for axial movement with respect to the ratchet, an operating means for imparting an initial movement to the clutch, and means for causing positive engagement or disengagement of the clutch.

6. In combination in a change-speed gear, a main shaft, a driving-pulley operatively mounted thereon, sun-and-planet gears intermediate the driving pulley and shaft, a ratchet adapted for movement in one direction, sun-and-planet gears intermediate the ratchet and driving-pulley, a clutch adapted to control the relative movements of the pulley and shaft, a lever for moving said clutch, means for imparting a partial movement to said lever and a resilient actuator for causing engagement and disengagement of the clutch.

7. In combination, in a change-speed mechanism comprising a main shaft, a driving-pulley, sun-and-planet gears and means for imparting a slow motion from the pulley to the shaft through said gears, a clutch adapted to control the relative movements of the driving pulley and shaft, an operating-lever for said clutch, cams for imparting a predetermined movement to said clutch-lever and a spring-latch and stop for completing the movements of the lever.

8. In combination in a device of the class specified, a main shaft, a driving-pulley mounted thereon, a clutch for controlling the relative movements of the pulley and driving-shaft, a plurality of sun-and-planet gears intermediate the driving-pulley and driving-shaft, and means whereby the position of said gears may be changed for varying the gear ratio.

9. In combination in a device of the class specified, a driving-shaft, a pulley mounted thereon, a shaft borne in the pulley and provided at one end with a gear, the gear, a ratchet adapted to move in one direction, a gear operatively connected with the ratchet and in mesh with the gear at one end of the shaft borne in the pulley, a plurality of gears borne upon the opposite end of said shaft, one of which is in mesh with one of a plurality of gears borne upon the main shaft and bodily removable therefrom, and means whereby said gears may be removably secured to the shaft.

10. In combination in a device of the class specified, a main shaft, a pulley operatively mounted thereon, a system of sun-and-planet gearing comprising a plurality of gears intermediate the pulley and shaft, friction-clutches intermediate the several individual gears of the sun-and-planet system, and means for adjusting one or the other of said gears into or out of operative relation with respect to its mating gear.

11. In combination in a device of the class specified, a main shaft, a pulley operatively mounted thereon, means for imparting a partial movement from the pulley to said shaft during the rotation of the former, said means comprising a system of sun-and-planet gears and including a plurality of gears borne upon the pulley, a coöperating gear borne upon the shaft, and a second gear borne upon the last-named gear, said shaft-gears being bodily removable and interchangeable with respect to the gears borne upon the pulley whereby various gear ratios may be secured.

12. In combination, a support for a driving-shaft, the driving-shaft, a driving-pulley loosely mounted upon said shaft, intermeshing gears borne upon the pulley and shaft one of which gears is secured to the shaft and another loose thereon, a ratchet rigidly connected with the gear loose on the shaft, means for preventing backward movement of the ratchet, and a clutch adapted to rigidly connect the ratchet and pulley.

13. In combination, a support for a driving-shaft, the driving-shaft, a gear secured thereto and a gear loosely mounted thereon, a driving-pulley loosely mounted upon said shaft, a plurality of gears borne by the pulley and adapted to mesh with the gears arranged on the shaft, and on opposite sides of the pulley, means for opposing backward movement of one of the gears on the shaft, and means for locking the gears on the pulley against rotation.

14. In combination, a support for a driving-shaft, the driving-shaft, a gear secured thereto and a gear loose thereon, a driving-pulley loosely mounted on the shaft, a gear in mesh with said gear fast on the shaft, said gear upon the shaft and gear upon the pulley each being one of a pair of gears, each pair borne respectively upon the pulley and shaft, and one gear only of each pair adapted to mesh at a time, and means for preventing backward rotation of the gear loosely mounted on the shaft.

15. In combination, a support for a driving-shaft, the driving-shaft, a gear secured thereto and a gear loose thereon, a driving-pulley loosely mounted upon said shaft, a gear borne upon the pulley in mesh with the gear fast upon the shaft each constituting one of a pair of gears mounted respectively on the shaft and pulley, one gear of each of the pairs adapted to mesh with a corresponding gear on the other pair, means for preventing backward rotation of the gear loosely mounted on the shaft, and a clutch adapted to connect the pulley and shaft.

16. In combination, a main shaft, a driving-pulley, sun-and-planet gears on the shaft and pulley, means for imparting a slow motion from the shaft to the pulley through said gears, a clutch adapted to control the relative movements of the driving pulley and shaft, an operating-lever for said clutch, means for imparting an initial movement to said clutch-lever, and resilient means for completing the movement of the lever.

17. In combination, a main shaft, a gear loose on the shaft and a gear secured thereto, a pulley having gears on opposite sides thereof secured upon a common shaft, a shaft journaled in the pulley and with its gears adapted to mesh with the gears on the shaft, means for locking said gears on the pulley against rotation and means for preventing backward movement of the gear loose on the shaft.

18. In combination, a main shaft, a driving-pulley, sun-and-planet gears mounted on the pulley and shaft, a positive clutch for connecting the pulley and shaft, means for initially moving said clutch, and resilient means for completing the movement of the clutch.

19. In combination, a main shaft, a driving-pulley mounted thereon, a clutch for controlling the relative movements of the pulley and driving-shaft, a plurality of sun-and-planet gears intermediate the driving-pulley and driving-shaft, and means whereby the position of said gears may be changed for varying the gear ratio.

20. In combination, a main shaft, a driving-pulley mounted thereon, intermeshing gears borne on the pulley and shaft and having means for changing the gear ratios without removing the gears from said shafts.

21. In combination, a main shaft, a driving-pulley mounted thereon, a gear loose on the shaft and a gear secured thereto, gears borne on the pulley and adapted to mesh with the gears on the shaft, said intermeshing gears having means for changing the gear ratios without removing the gears, a ratchet secured to the gear loose on the shaft, and means for preventing backward movement of the ratchet.

22. In combination, a main shaft, a pulley operatively mounted thereon, means for imparting a partial movement from the pulley to said shaft during the rotation of the former and comprising a system of sun-and-planet gears that includes a plurality of gears borne upon the pulley, a coöperating gear borne upon the shaft, a second gear borne upon the last-named gear, said gears having means for changing the gear ratios.

ERNEST R. SEWARD.

Witnesses:
WM. H. BARKER,
G. L. MASON.